Figure 1:
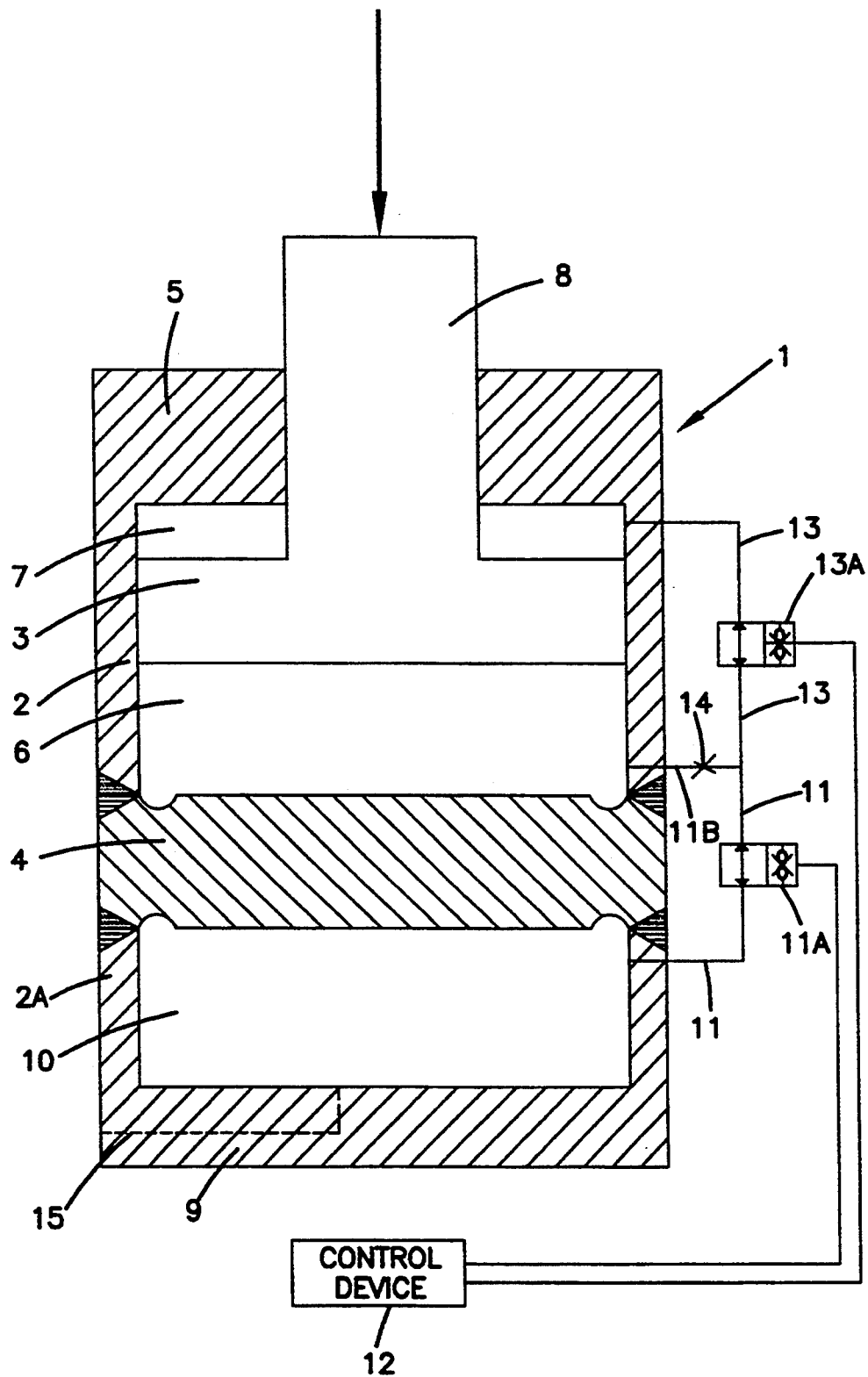

United States Patent [19]

Sand

[11] Patent Number: 5,435,530
[45] Date of Patent: Jul. 25, 1995

[54] GAS SPRING WHICH AFTER COMPRESSION HAS A TIME DELAYED RETURN TO ITS ORIGINAL LENGTH

[75] Inventor: Gunnar Sand, Huskvarna, Sweden

[73] Assignee: Stromsholmens Mekaniska Verkstad AB, Tranas, Sweden

[21] Appl. No.: 119,206

[22] PCT Filed: Apr. 14, 1992

[86] PCT No.: PCT/SE92/00241

§ 371 Date: Nov. 26, 1993

§ 102(e) Date: Nov. 26, 1993

[87] PCT Pub. No.: WO92/19886

PCT Pub. Date: Nov. 12, 1992

[30] Foreign Application Priority Data

Apr. 24, 1991 [SE] Sweden ............... 9101252

[51] Int. Cl.⁶ ............................................. F16F 5/00
[52] U.S. Cl. ............................... 267/114; 267/119
[58] Field of Search ............ 267/64.12, 64.16, 64.18, 267/64.26, 64.28, 118, 119, 130; 188/269, 285, 299, 314, 322.11, 322.19, 322.21; 91/165; 92/134; 72/453.10–453.13; 280/708

[56] References Cited

U.S. PATENT DOCUMENTS

| | | | |
|---|---|---|---|
| 3,524,634 | 8/1970 | Schmidt | 188/299 |
| 3,962,895 | 6/1976 | Rydell | 267/119 |
| 4,229,965 | 10/1980 | Spacek et al. | 267/119 |
| 4,245,854 | 1/1981 | Curnutt | 267/64.28 |
| 4,506,869 | 3/1985 | Masclet et al. | 188/322.21 |
| 4,687,187 | 8/1987 | Bellapadrona | 267/64.18 |
| 4,934,230 | 6/1990 | Wallis | 83/128 |
| 4,961,316 | 10/1990 | Corke et al. | 92/134 |
| 5,076,404 | 12/1991 | Gustafsson | 267/130 |
| 5,219,152 | 6/1993 | Derrien et al. | 267/118 |
| 5,263,559 | 11/1993 | Mettner | 188/299 |
| 5,337,864 | 8/1994 | Sjostrom | 188/299 |

FOREIGN PATENT DOCUMENTS

609537 2/1935 Germany.
9015267 12/1990 WIPO.

Primary Examiner—Robert J. Oberleitner
Assistant Examiner—Chris Schwartz
Attorney, Agent, or Firm—Merchant, Gould, Smith, Edell, Welter & Schmidt

[57] ABSTRACT

The invention consists on the one hand of a cylinder (2) closed at its ends by means of end walls (4, 5) and on the other hand of an enclosed space (10). With a piston (3) capable of axial displacement, the cylinder (2) is divided into two sub-spaces (6, 7). The space (10) communicates with the aforementioned first sub-space (6) via a first openable and closable valve (11a). The second sub-space (7) communicates with the aforementioned first sub-space (6) via a second openable and closable valve (13a). A control device (12) actuates the openable and closeable valves (11a, 13a), so that the second valve (13a) is opened when a force (F) acting upon the end of the piston rod (8) has forced the piston (3) in a direction towards the first end wall (4) and into a predetermined position. The second valve (13a) is closed again once pressure equilibrium has been achieved between the sub-spaces (6, 7). The first valve (11a) is opened for a period of sufficient duration to permit pressure equilibrium to be achieved between the second sub-space (7) and the enclosed space (10). After a predetermined period has elapsed after the force (F) acting against the end of the piston rod has ceased to be applied, the aforementioned second valve (13a) opens, when the piston (3) returns to its initial position. Once the piston (3) has reached its initial piston, the first valve (11a) is opened.

4 Claims, 3 Drawing Sheets

GAS SPRING WHICH AFTER COMPRESSION HAS A TIME DELAYED RETURN TO ITS ORIGINAL LENGTH

The present invention relates to an arrangement for a gas spring consisting on the one hand of a cylinder closed at both ends by means of end walls with a piston capable of axial displacement inside the fluid-filled inner space of the cylinder, which piston divides the latter into two sub-spaces, of which a first is bounded by a first end wall, the piston and an interjacent part of the cylinder wall, and the second sub-space is bounded by the second end wall, in which a piston rod operatively connected to the piston is mounted in a sliding and sealing fashion, the piston and an interjacent part of the cylinder wall, and on the other hand of an enclosed space so arranged as to communicate with the aforementioned first sub-space via a first openable and closable valve.

A gas spring of the kind referred to above, which, after compression, exhibits a delayed return to its original length, is described in more detail in WO90/15267 (SE-B-462 726). Also described in the aforementioned publication is an application for such a gas spring with a delayed return, namely for the purpose of ejecting a pressed component from a pressing tool.

Although a gas spring of the kind referred to above has an entirely satisfactory function, there is a general wish to have available a gas spring with smaller installation dimensions for otherwise unchanged characteristics. A further wish is to have available a gas spring which operates exclusively with gas. The gas spring referred to by way of introduction, however requires a gas/oil mixture; the use of gas alone in a gas spring according to WO90/15267 would permit the piston rod to execute undesirable overspringing movements.

The object of the present invention is to make available a gas spring of the kind referred to by way of introduction, which has smaller installation dimensions than previously disclosed gas springs, and which operates exclusively with gas. This is achieved in accordance with the invention in that the second sub-space is so arranged as to communicate with the aforementioned first sub-space via a second openable and closable valve, and in that the arrangement comprises a control device for actuating the aforementioned openable and closable valves so arranged as to enable the second valve to open when a force acting upon the end of the piston rod from an initial position close to the second end wall, in which the spring exhibits its original length, has forced the piston in a direction towards the first end wall and into a predetermined position, as to close the second valve again after a period of sufficient duration for pressure equilibrium to have been achieved between the aforementioned sub-spaces, as to enable the first valve to open for a period of sufficient duration to permit pressure equilibrium to be achieved between the second sub-space and the enclosed space and, after a predetermined period has elapsed after the force acting against the end of the piston rod has ceased to be applied, as to open the aforementioned second valve, when the piston returns to its initial position, and, once the piston has reached its initial position, as to open the first valve. The ability of the gas spring in accordance with the invention to operate without oil has environmental advantages on the one hand, in that the risk of oil leaks is entirely eliminated, and on the other hand has service/technical advantages.

An especially compact and installation-friendly design is achieved, as may be appreciated from one particular characteristic of the invention, in that the aforementioned enclosed space constitutes an extension of the cylinder and, as such, is bounded by the first end wall, a third end wall and an interjacent part of the cylinder wall.

By executing a first communicating line between the first sub-space and the enclosed space in the form of a channel in the first end wall, the advantage is achieved that the aforementioned first line lies entirely protected inside the gas spring.

An entirely protected second line between the first sub-space and the second sub-space is provided in that the cylinder is executed with a cylinder liner which extends between the first and the second end wall and forms a cylindrical gap together with the cylinder wall, and in that a second communicating line between the first sub-space and the second sub-space consists of a channel connected to the cylindrical gap in the first end wall and a channel in the liner wall close to the second end wall.

When pressing a component, as described in more detail in the publication referred to by way of introduction, there is a requirement, at least during a short period preceding the actual ejection, for ejector devices interacting with the piston rod to move out of contact with the finished component. This is achieved in accordance with a further particular characteristic of the present invention in that the arrangement comprises a second cylinder with a piston capable of moving axially therein, the piston rod of which is so arranged as to be actuated, synchronously with the piston rod, by the force, and which, with an end wall and an interjacent part of the cylinder wall, forms a cylinder chamber, the volume of which varies with the position of the piston in the cylinder, and which is so arranged, via a third openable and closable valve, as to communicate with the second sub-space, and in that the aforementioned control device is so arranged as to cause the valve to open once the first valve has closed, i.e. with the piston in its end position, and as to close once more after pressure equilibrium has been achieved between the chamber and the sub-space.

Figure 2:
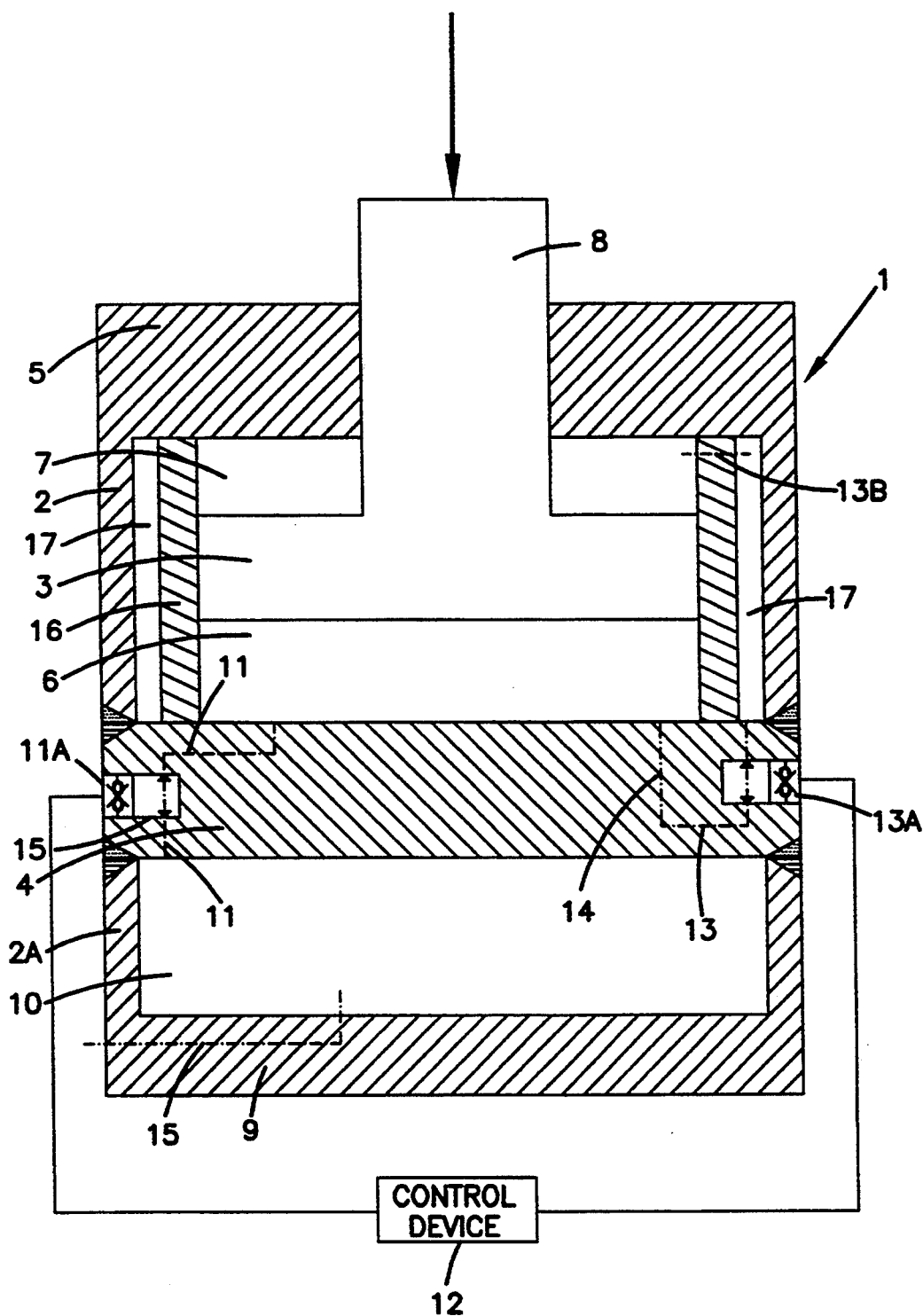
Figure 3:
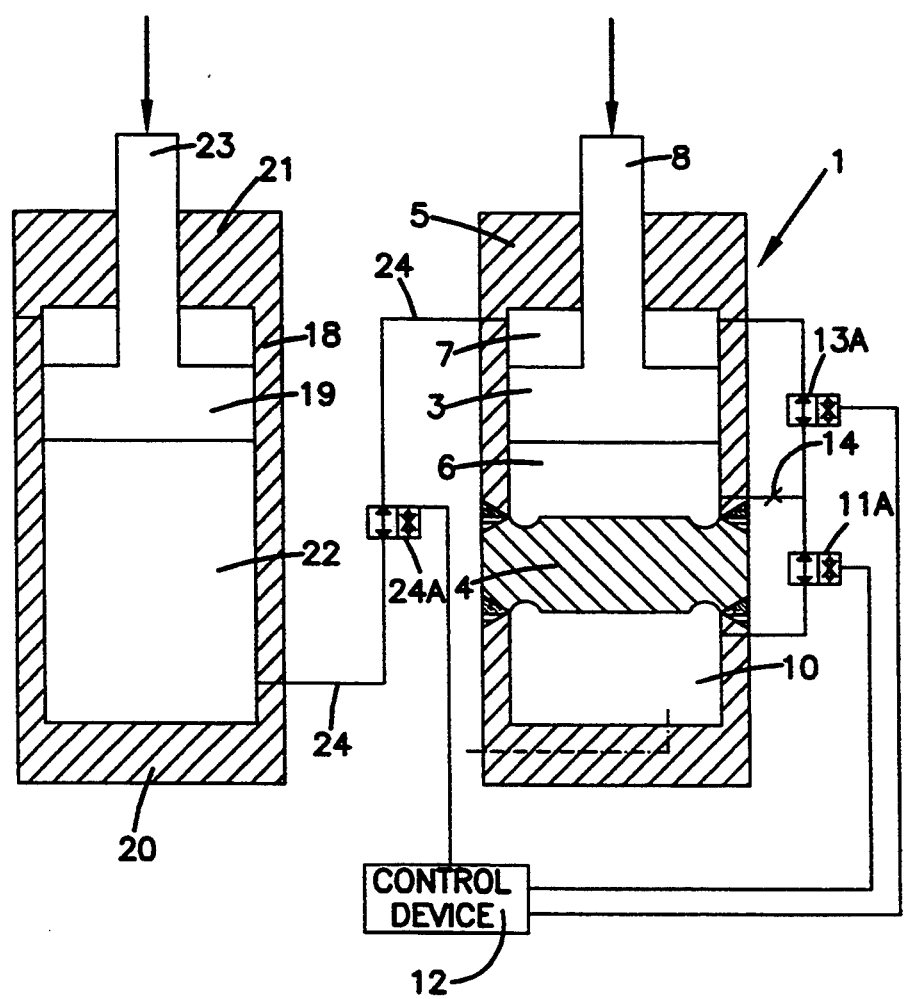

The invention is explained in greater detail below with reference to the accompanying drawing, in which FIG. 1 is a schematic representation in longitudinal section of an arrangement in accordance with the invention, FIG. 2 is a schematic representation in longitudinal section of an alternative design of an arrangement in accordance with the invention, in which no external pneumatic lines are present, FIG. 3 is a schematic representation in longitudinal section of a further alternative design of an arrangement in accordance with the invention, in which an additional depression movement can be imparted to the piston rod of the gas spring by means of a cylinder/piston unit interacting with the gas spring.

Details with identical or similar functions have been given the same reference designations in all the Figures in the drawing. The illustrations in the Figures are generally highly simplified, in order to illustrate clearly what is significant for the invention. Details such as seals and sliding bearings and assembly components, which are obvious to a person skilled in the art, have thus been omitted.

The designation 1 is used generally in FIG. 1 to denote a gas spring. This comprises a cylinder 2 with a piston 3 capable of axial displacement therein. The cylinder is closed at both its ends by means of end walls 4, 5. The wall of the cylinder 2 and the end walls 4, 5 enclose a space which is divided by the piston 3 into two sub-spaces 6, 7. A first sub-space 6 is bounded by a first end wall 4, the piston 3 and an interjacent part of the wall of the cylinder 2. The second sub-space 7 is bounded by the second end wall 5, the piston 3 and an interjacent part of the cylinder wall. A piston rod 8 attached to the piston 3 is mounted in a sliding and sealing fashion in the end wall 5. An extension 2a of the cylinder 2, together with the end wall 4 and a third end wall 9, forms an enclosed space 10, which, via a line 11 with an openable and closable valve 11a, communicates with the sub-space 6. The valve 11a is actuated by means of signals from a control device 12, details of which are given later.

In accordance with the invention the second sub-space 7 is so arranged as to communicate with the first sub-space 6 via a line 13 with an openable and closable valve 13a. A section of the line 13, which is common with the line 11, has been given the designation 11a in the drawing and comprises a switchable throttle 14 so arranged as to impart a controllable return speed to the piston 3, as explained below. A dotted and dashed line 15 is used to represent schematically a filling channel via which the enclosed space 10 and the sub-space 6 of the cylinder are pressurized to a gas pressure of approximately 150 bar. It is assumed for this purpose that the piston 3 is in its initial position close to the end wall 5, and that no force is acting upon the outer free end of the piston rod 8.

During a single pressing cycle, the end of the piston rod is first acted upon by a force F, which is removed once the component in question has been pressed. Under the effect of the force F, the gas spring is compressed from its maximum length to a predetermined length. For the purpose of ejecting the pressed component, the gas spring is allowed to resume its maximum length at a controllable return speed. The arrangement in accordance with the invention operates in the following way during this process:

Under the effect of the force F, the piston 3 of the gas cylinder 1 is caused Lo move from its initial position close to the end wall 5 in the direction of the end wall 4. Controlled by a signal, for example from a sequential indicator of a conventional kind arranged on the press, the control device 12 caused the valve 13a to open so that the sub-spaces 6 and 7 are connected to one another via the line 13, when the pressure in the aforementioned spaces reaches approximately 175 bar. The valve 11a is closed, for which reason the pressure inside the enclosed space remains unchanged at 150 bar.

Once the piston 3 reaches its end position close to the end wall 4, the valve 13a is closed on a signal from the control device 12. The pressure inside the sub-spaces 6 and 7 is now approximately 200 bar. The successive pressure increase is attributable to the reduction in the total volume of the aforementioned sub-spaces 6, 7 as a consequence of the piston rod 8 being forced into the inner space of the cylinder 2. Under the effect of the control device 12, the valve 11a is opened sufficiently to permit pressure equalization to take place between the sub-space 6 and the enclosed space 10, whereupon the valve 11a is closed once more. A pressure of 150.05 bar bar is now present inside the sub-space 6 and inside the enclosed space 10, whereas the pressure inside the sub-space 7 is 200 bar. The fact that the surface of the piston 3 which is exposed to this pressure is smaller to a certain extent, through the effect of the piston rod 8, than the surface of the piston which is exposed to the pressure of 150.05 bar bar inside the sub-space 6, produces an equilibrium which causes the piston 3 to remain in its end position including at that point in the pressing cycle at which the component is pressed and the force F ceases. In order to eject the component from the pressing tool, the control device 12 is caused to open the valve 13a so that the sub-parts 6, 7 will communicate. During the pressure equalization which occurs in conjunction with this, the piston 3 moves towards its initial position. The return speeds of the piston are capable of being damped by previously disclosed means in a controlled fashion via the throttle 14.

Once the piston 3 has reached its initial position, the control device 12 is able to open the valve 11a, and since the valve 13a is already open, equal pressure now exists inside the sub-spaces 6, 7 and inside the enclosed space 10. The valve 11a is now closed, and a new pressing cycle can commence.

The alternative design of an arrangement in accordance with the invention illustrated in FIG. 2 has exactly the same function described above in connection with the design in accordance with FIG. 1, but differs in the following respects:

The line 11 between the sub-space 6 and the enclosed space 10 consists of a channel in the end wall 4, and the valve 11a is installed inside a cavity 15 in the end wall 4 connected to that channel. The cylinder 2 is also executed with a cylinder liner 16 which is in sealing contact with the end walls 4, 5. A cylindrical gap 17 is present between the wall of the cylinder 2 and the liner 16. The line 13 between the sub-spaces 6 and 7 consists of a channel in the end wall 4 connected to the sub-space 6 and the cylindrical gap 17, the cylindrical gap 17, and a channel 13b, which is arranged in the wall of the liner 16 close to the end wall 5 and connects the cylindrical gap 17 to the sub-space 7.

The design of an arrangement in accordance with the invention illustrated in FIG. 3 comprises, in addition to the gas spring 1, a second cylinder 18 with a piston 19 capable of axial displacement therein and with end walls 20, 21. The piston 19 and the end wall 20, together with an interjacent part of the wall of the cylinder 18, form a cylindrical chamber 22, the volume of which varies with the position of the piston 19 inside the cylinder 18. A piston rod 23 attached to the piston 19 is mounted in a sliding fashion in the end wall 21. The cylindrical chamber 22 is so arranged as to communicate with the sub-space 7 inside the gas spring 1 via a line 24 with an openable and closable valve. The valve 24a is operatively connected to the control device 12.

The arrangement in accordance with FIG. 3 operates in the following way:

In an initial position the piston rods 8 and 23 are not acted upon by any force, and the pistons 3 and 19 are in their initial positions, i.e. close to the end walls 5 and 21. The valves 11a, 13a and 24a are kept closed by signals from the control device 12. The same pressure exists inside the sub-space 6, the enclosed space 10 and the cylindrical chamber 22. The pressure reaches approximately 150 bar.

Under the effect of the force F originating from the pressing tool on the piston rods 8, 23, the pistons 3 and 19 move from their initial positions towards their respective end positions. The valve 13a is caused to open by the control device 12, and the valves 11a and 24a remain closed. The movement of the piston 19 increases the pressure inside the cylindrical chamber successively from the previous 150 bar to 220 bar, and at the same time the pressure inside the sub-spaces 6 and 7 increases from 150 bar to 200 bar once the piston 3 has reached its end position close to the end wall 4. Once this has occurred, the control device 12 causes the valve 13a to close. Once this has occurred, the valve 11a is caused to open for as long as pressure equalization continues to exist between the sub-space 6 and the enclosed space 10. The pressure inside the aforementioned spaces is 150.05 bar bar after the pressure equalization. While the valve 11a is still open, the valve 24a is caused to open by the control device 12. The pressure equalization to 210 bar, which now occurs between the sub-space 7 and the cylindrical chamber 22, caused the pistons 3 and 19 to move rapidly for a further short distance towards the end walls 4 and 20, which means that the ends of the piston rods 8, 23 lose contact with the part of the tool which previously acted upon the piston rods with the force F (push-down). This movement is, as a person skilled in the art will readily appreciate, of major significance to the result of the pressing operation. Once the push-down movement has been completed, the control device causes the valves 11a and 24a to close, which is initiated by a tool movement, which means that the force F, which previously acted upon the piston rods 18 and 23, ceases. As a consequence of this the piston 19 is caused to move to its initial position, in conjunction which the pressure inside the cylindrical chamber 22 falls from 210 to 140 bar. The valve 13a now opens, and the piston 3 moves upwards in the same way as described during the corresponding phase in conjunction with FIG. 1, when the movement of the piston is damped by the throttle 14. Once the piston 3 has reached its initial position, all the valves 11a, 13a and 24a are opened so that the same pressure is present everywhere, i.e. inside the sub-spaces 6 and 7, inside the enclosed space 10, and inside the cylindrical chamber 22. The arrangement is now ready for the next pressing cycle.

Once the piston 3 has reached its initial position, all the valves are caused to open. The result of this is that the same pressure is present inside the sub-spaces 6 and 7 and inside the cylindrical chamber 22, and a new pressing cycle can commence.

It is obvious that the pressure values referred to above shall be regarded only as examples intended to give some idea of the order of magnitude of these pressures. A person skilled in the art will appreciate that, at the levels of pressure which are present inside the sub-spaces 6, 7, the enclosed space 10 and the cylindrical chamber 22, the dimensioning of the areas of the piston surfaces which are acted upon by the aforementioned pressures is dependent upon the lengths of stroke, etc., of the pistons.

It is also obvious that there is scope for many different detailed designs within the simplified representation selected here in the interests of optimal clarity, and that these are included within the idea of invention.

I claim:

1. Arrangement for a gas spring (1) consisting of a cylinder (2) closed at both ends by means of end walls (4, 5) with a piston (3) capable of axial displacement inside a fluid-filled inner space of the cylinder (2), which piston divides the latter into two sub-spaces (6, 7), a first sub-space and a second sub-space, of which the first sub-space (6) is bounded by a first end wall (4), the piston (3) and an interjacent part of the wall of the cylinder (2), and the second sub-space (7) is bounded by a second end wall (5), in which a piston rod (8) operatively connected to the piston (3) is mounted in a sliding and sealing fashion, and of an enclosed space (10) so arranged as to communicate with the aforementioned first sub-space (6) via a first openable and closable valve (11a), characterized in that the second sub-space (7) is so arranged as to communicate with the aforementioned first sub-space (6) via a second openable and closable valve (13a), and in that the arrangement comprises a control device (12) for actuating the aforementioned openable and closable valves (11a, 13a) so arranged as to enable the second valve (13a) to open when a force (F) acting upon the end of the piston rod (8) from an initial position close to the second end wall (5), in which the spring exhibits its original length, has forced the piston (3) in a direction towards the first end wall (4) and into a predetermined position, as to close the second valve (13a) again after a period of sufficient duration for pressure equilibrium to have been achieved between the aforementioned sub-spaces (6, 7), as to enable the first valve (11a) to open for a period of sufficient duration to permit pressure equilibrium to be achieved between the first sub-space (6) and the enclosed space (10) and, after the period of sufficient duration has elapsed, the first valve (11a) closes.

2. Arrangement in accordance with Patent claim 1, characterized in that the aforementioned enclosed space (10) constitutes an extension of the cylinder and, as such, is bounded by the first end wall, a third end wall and an interjacent part of the cylinder wall.

3. Arrangement in accordance with Patent claim 2, characterized in that a first communicating line between the first sub-space (6) and the enclosed space (10) is executed in the form of a channel in the first end wall (4).

4. Arrangement in accordance with claim 1, characterized in that the cylinder comprises a cylinder liner (16) which extends between the first (4) and the second (5) end wall and forms a cylindrical gap (17) together with the wall of the cylinder (2), and in that a second communicating line (13) between the first sub-space (6) and the second sub-space (7) consists of a channel connected to the cylindrical gap (17) in the first end wall (4) and a channel in the liner wall close to the second end wall (5).

* * * * *